US006667098B1

(12) United States Patent
Eklind et al.

(10) Patent No.: US 6,667,098 B1
(45) Date of Patent: Dec. 23, 2003

(54) ELECTRIC CABLE

(75) Inventors: Hans Eklind, Göteborg (SE); Bill Gustafsson, Stenungsund (SE); Ola Fagrell, Stenungsund (SE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/958,514

(22) PCT Filed: May 4, 2000

(86) PCT No.: PCT/SE00/00862

§ 371 (c)(1),
(2), (4) Date: Oct. 9, 2001

(87) PCT Pub. No.: WO00/68957

PCT Pub. Date: Nov. 16, 2000

(30) Foreign Application Priority Data

May 5, 1999 (SE) .............................................. 9901620

(51) Int. Cl.$^7$ ............................ B32B 15/08; H01B 3/44

(52) U.S. Cl. ....................... 428/380; 428/375; 428/379; 428/391; 428/457; 428/447; 428/450; 428/461; 428/463; 174/68.1; 174/110 SR

(58) Field of Search ................................ 428/375, 379, 428/380, 391, 457, 447, 450, 461, 463; 174/68 A, 110 SR

(56) References Cited

U.S. PATENT DOCUMENTS

| | | | |
|---|---|---|---|
| 3,646,155 A | 2/1972 | Scott | 525/288 |
| 4,117,195 A | 9/1978 | Swarbrick et al. | 428/379 |
| 4,983,675 A | 1/1991 | Ishino et al. | 525/100 |
| 5,237,014 A | 8/1993 | Barnabeo | 525/291 |

FOREIGN PATENT DOCUMENTS

| | | |
|---|---|---|
| DE | 28 56 369 | 7/1980 |
| EP | 0 110 038 | 6/1984 |
| EP | 0 449 339 | 10/1991 |
| WO | WO 95/17462 | 6/1995 |
| WO | WO 95/17463 | 6/1995 |
| WO | WO 98/14516 | 4/1998 |

*Primary Examiner*—Monique R. Jackson
(74) *Attorney, Agent, or Firm*—Merchant & Gould P.C.

(57) ABSTRACT

A cable comprising an electrical conductor with insulating and protecting layers surrounding the conductor is described. The cable is characterised in that at least one layer selected from said insulating and protecting layers consists of a crosslinked ethylene-alkyl (meth)acrylate-unsaturated silane terpolymer composition wherein the alkyl (meth) acrylate comonomer comprises more than 5 mole % and the terpolymer composition has a tensile modulus, determined according to ISO 527-2 (1 mm/min) of less than 100 MPa. Preferably, the crosslinked ethylene-alkyl (meth)acrylate polymer is a moisture curable ethylene-alkyl (meth)acrylate-vinyl trialkoxysilane terpolymer, wherein the trialkoxysilan termonomer comprises 0.2–5% by weight of the polymer composition. The polymer composition may include from 0 up to 50% by weight of a plasticiser, up to 60% by weight of a filler, and up to 10% by weight of an additive.

12 Claims, No Drawings

ELECTRIC CABLE

TECHNICAL FIELD

The present invention relates to an electrical cable, and more particularly to an electrical rubber cable.

TECHNICAL BACKGROUND

Electrical rubber cables, are flexible electrical cables with a conductor surrounded by an insulating layer and an outer jacketing layer. Several insulated conductors may be enclosed by one jacket. Such rubber cables are usually low or medium voltage cables, i.e. they are intended for voltages up to about 10 kV. The insulating and/or jacketing layers are conventionally made of natural rubber (NR) or ethylene-propylene rubber (EPR), e.g. EPDM or EPM.

There are several disadvantages associated with rubber cables. Thus, the fact that they comprise rubbery components means that they are made according to conventional rubber processing procedures. This includes handling of powdery raw materials, processing of the powdery raw materials in special rubber compounding equipment, and curing of the cables by curing procedures involving sulphur or peroxide curing agents. Further, the ageing resistance of rubber cables often leaves something to be desired as does the resistance against solvents such as gasoline or oils.

It would therefore be an important progress in the art if a rubber cable could be obtained that is made of ordinary ethylene polymer material and that is produced with ordinary polymer processing equipment.

SUMMARY OF THE INVENTION

It is an object of the present invention to ameliorate or eliminate the drawbacks of the prior art and provide an electrical cable of the rubber cable type where the insulation and/or jacketing is made of a crosslinked rubbery ethylene polymer composition.

It is a further object of the invention to provide an electrical cable of the rubber cable type where the insulating and/or jacketing layer(s) are made of pelleted raw materials that are easy to handle.

It is a still further object of the invention to provide an electrical cable of the rubber cable type where the insulating and/or jacketing layer(s) are obtained by extruding the materials (s).

It is another object of the invention to provide an electrical cable of the rubber cable type which is cross linkable by so-called moisture curing.

It is still another preferred object of the invention to provide an electrical cable of the rubber cable type with good ageing and solvent resistance.

Thus, according to the present invention there is provided a cable comprising an electrical conductor with insulating and protecting layers surrounding the conductor, characterised in that at least one layer selected from said insulating and protecting layers consists of a crosslinked ethylene-alkyl (meth)acrylate-unsaturated silane terpolymer composition wherein the alkyl (meth)-acrylate comonomer comprises more than 5 mole % and the terpolymer composition has a tensile modulus, determined according to ISO 527-2 (1 mm/min) of less than 100 MPa.

These and other advantages and characterising features of the present invention will appear from the following specification and the appended claims.

DETAILED DESCRIPTION OF THE INVENTION

Generally, and in connection with the present invention the expression "alkyl (meth)acrylate" includes alkyl acrylates as well as alkyl methacrylates. The alkyl moiety preferably is an alkyl group having 1–4 carbon atoms, such as methyl, ethyl, propyl, and butyl, preferably methyl or butyl.

Conventional ethylene-alkyl (meth)acrylate polymers generally comprise the alkyl (meth)acrylate comonomer in a low amount of up to about 10% by weight. The present invention differs from such conventional ethylene-alkyl (meth)acrylate copolymers in that it is not a copolymer, but a terpolymer containing an unsaturated silane compound as a termonomer, and also in that it contains the alkyl (meth) acrylate comonomer in a high amount of at least 5 mole %, preferably 5–25 mole %. More preferably the alkyl (meth) acrylate comonomer comprises about 9–20 mole % of the polymer. The high alkyl (meth)acrylate comonomer content at the present invention is necessary in order to make the polymer composition sufficiently soft and flexible.

The terpolymer according to the present invention should have a melt flow rate ($MFR_2$), determined according to ISO 1133, Condition D, of 0.1–40 g/10 min.

In this connection, it is a general requirement for rubber cables to have a Shore A hardness of less than 85. This requirement thus also applies to the the insulating and jacketing layers of the cable according to the present invention. The Shore A hardness is determined according to ISO 868.

Further, the terpolymer composition according to the present invention should have a tensile modulus, determined according to ISO 527-2 (1 mm/min) of less than 100 MPa, preferably less than 60 MPa, and most preferably less than 30 MPa.

As mentioned above, the ethylene-alkyl (meth)acrylate polymer composition of the insulating or jacketing layer of the inventive cable is crosslinkable.

The crosslinking at the present invention is by way of hydrolysable silane groups which are incorporated in the ethylene-alkyl (meth)acrylate polymer composition constituting the insulation and/or jacketing layer of the cable according to the invention.

The crosslinking of polymers with hydrolysable silane groups is carried out by so-called moisture curing. In a first step, the silane groups are hydrolysed under the influence of water or steam, resulting in the splitting-off of alcohol and the formation of silanol groups. In a second step, the silanol groups are cross linked by a condensation reaction splitting off water. In both steps, a so-called silanol condensation catalyst is used as a catalyst.

Silanol condensation catalysts include carboxylates of metals, such as tin, zinc, iron, lead and cobalt; organic bases; inorganic acids; and organic acids. In practice dibutyl tin dilaurate (DBTL) is generally used as the silanol condensation catalyst.

At the present invention it is preferred, however, to use a specific silanol condensation catalyst of formula I $$ArSO_3H \qquad (I)$$

or a precursor thereof, Ar being a benzene ring substituted with at least one hydrocarbyl radical such that the total number of carbon atoms of the hydrocarbyl radical(s) is 8–20, or a naphthalene ring substituted with at least one hydrocarbyl radical such that the total number of carbon atoms of the hydrocarbyl radical(s) is 4–18, and the catalyst of formula I containing 14–28 carbon atoms in total. This catalyst, as opposed to conventional silanol condensation catalysts such as e.g. DBTL allows crosslinking at ambient temperature such as room temperature.

A silanol condensation catalyst of the above defined type is disclosed in WO 95/17463 for the crosslinking of polymers with hydrolysable silane groups.

With regard to the silanol condensation catalyst of formula I it is preferred that the hydrocarbyl radical in formula I is an alkyl substituent with 10–18 carbon atoms.

The currently most preferred compounds of formula I are dodecyl benzene sulphonic acid and tetrapropyl benzene sulphonic acid.

It is further preferred that the polymer composition includes 0.0001–3% by weight of silanol condensation catalyst.

In the following the crosslinkable hydrolysable silane group containing polymer used for the insulating and/or jacketing layer composition according to the present invention will described.

The crosslinkable base resin generally is an ethylene copolymer or graft polymer which contains hydrolysable silane groups and which is crosslinked under the influence of water and at least one silanol condensation catalyst. Specifically, the crosslinkable polymer is an ethylene-alkyl (meth)acrylate polymer containing crosslinkable silane groups introduced either by copolymerisation or graft polymerisation.

Preferably, the silane-containing polymer has been obtained by copolymerisation of ethylene, an alkyl (meth) acrylate comonomer and an unsaturated silane termonomer compound represented by the formula II $$RSiR'_nY_{3-n} \qquad (II)$$

wherein

R is an ethylenically unsaturated hydrocarbyl, hydrocarbyloxy or (meth)acryloxy hydrocarbyl group, R' is an aliphatic saturated hydrocarbyl group, Y which may be same or different, is a hydrolysable organic group, and n is 0, 1 or 2.

If there is more than one Y group, these do not have to be identical.

Specific examples of the unsaturated silane compound are those wherein R is vinyl, allyl, isopropenyl, butenyl, cyclohexenyl or gamma-(meth)acryloxy propyl; Y is methoxy, ethoxy, formyloxy, acetoxy, propionyloxy or an alkyl- or arylamino group; and R', if present, is a methyl, ethyl, propyl, decyl or phenyl group.

A preferred unsaturated silane compound is represented by formula III $$CH_2{=}CHSi(OA)_3 \qquad (III)$$

wherein A is a hydrocarbyl group having 1–8 carbon atoms, preferably 1–4 carbon atoms.

The most preferred compounds are vinyl trimethoxysilane, vinyl triethoxysilane, gamma-(meth) acryloxypropyltrimethoxysilane and vinyl triacetoxysilane or combinations of two or more thereof.

The copolymerisation of the ethylene, the alkyl (meth) acrylate, and the unsaturated silane compound may be carried out under any suitable conditions resulting in polymerisation of the monomers, e.g. as disclosed in GB 2,088, 831.

The silane-containing polymer according to the invention suitably contains 0.2–5.0% by weight of the silane compound, preferably 0.5–3% by weight.

If using a graft polymer, this may be produced e.g. by the methods described in U.S. Pat. No. 3,646,155 and U.S. Pat. No. 4,117,195.

The above ethylene-alkyl (meth)acrylate-unsaturated silane terpolymers are produced by radical initiated high pressure polymerisation. Generally, the polymerisation of the monomers is carried out at a temperature of about 100–300° C. and at a pressure of about 100–300 MPa in the presence of a radical initiator in a polymerisation reactor. Usually, the polymerisation is carried out continuously, preferably in a tubular reactor or in a stirred tank reactor.

Usually, when polymerising ethylene-alkyl (meth) acrylate polymers with a high content of (meth)acrylate the polymerisation may be troubled by fouling of the polymerisation reactor which manifests itself as unstable and inhomogenous production. To alleviate this problem and inhibit fouling during the polymerisation an adhesion reducing silicon containing compound, e.g. a silane or a silicone compound may be added as an anti-fouling agent to the polymerisation reactor, as is disclosed in the international patent application PCT/SE98/01949, filed on Oct. 28, 1998. At the present invention it is not necessary to add any such anti-fouling agent, because the terpolymer of the present invention includes a silane termonomer which avoids fouling and in practice acts as an anti-fouling agent.

Although ethylene-alkyl (meth)acrylate polymers, such as ethylene-methyl acrylate polymers in general and polymers with a high content of alkyl (meth)acrylate comonomer such as the ethylene-alkyl (meth)acrylate-unsaturated silane terpolymer of the present invention in particular are sufficiently soft and flexible at room temperature, they become increasingly stiff and rigid at lower temperatures such as sub-zero temperatures. With regard to electrical cables of the rubber cable type these must be soft and flexible not only at room temperature, but also at sub-zero temperatures, such as −20° C. to −30° C. to be of practical use.

The present invention has solved this problem by adding a plasticiser to the ethylene-alkyl (meth)acrylate polymer composition when desired or necessary. The particular type of plasticiser is not critical to the present invention, but it is preferred that the plasticiser is selected from a particular group of plasticisers.

These preferred plasticiser are selected from the group consisting of: alkyl alcoholes; secondary or tertiary amines; esters of carboxylic acids with at least one carboxylic function; amides of mono- or dicarboxylic acids; esters of phosphoric acid; organic oils; and mineral oils.

These plasticisers result in a composition of the desired softness and flexibility both at room temperature and at sub-zero temperatures. In addition they are compatible with the polymer and do not migrate from the polymer or result in exudation.

Preferably, the plasticiser is selected from the group consisting of: linear or branched $C_8$–$C_{18}$ alkyl alcoholes; linear or branched $C_4$–$C_{18}$ alkyl secondary or tertiary amines; linear or branched $C_4$–$C_{18}$ alkyl esters of $C_6$–$C_{10}$ dicarboxylic acids; $C_4$–$C_{18}$ N-substituted amides of $C_{12}$–$C_{18}$ linear monocarboxylic acids or $C_6$–$C_{10}$ dicarboxylic acids; alkyl, aryl, alkylaryl, or arylalkyl esters of phosphoric acid where the alkyl moiety is $C_6$–$C_{18}$ and the aryl moiety is phenyl; organic oils like sunflower oil, rape seed oil, terpene oil or soybean oil; and mineral oils like paraffinic oil, aromatic oil and, in particular, naphtenic oil.

Among the preferred linear or branched $C_8$–$C_{18}$ alkyl alcoholes may be mentioned octanols like 2-ethyl-1-hexanol or 1-octanol, 1-decanol and 1-dodecanol, etc.

Among the preferred linear or branched $C_4$–$C_{18}$ alkyl secondary or tertiary amines compounds like tri-n-butyl amine and di-n-hexyl amine may be mentioned.

Among the esters of dicarboxylic acids are esters of aliphatic dicarboxylic acids with 6–10 carbon atoms, such as adipic acid, pimelic acid, suberic acid, azelaic acid, and sebacic acid. Preferably, the esters are alkyl esters where the alkyl moiety has 4–18 carbon atoms, such as butyl, pentyl, hexyl, heptyl, octyl, nonyl, decyl, undecyl, dodecyl, tridecyl, etc. Particularly preferred are $C_4$–$C_{18}$ alkyl esters of adipic acid.

Among esters of dicarboxylic acids are also esters of aromatic dicarboxylic acids, such as alkyl esters of phthalic acid. As particular examples of alkyl esters of phthalic acid may be mentioned e.g. dimethyl phthalate, diethyl phthalate, dibutyl phthalate (DBP), diisobutyl phthalate, dihexyl phthalate, dioctyl phthalate (DOP), diisooctyl phthalate, diisononylphthalate, diisodecyl phthalate, diundecylphthalate, ditridecyl phthalate, butyl benzyl phthalate, butyl octyl phthalate, dicapryl phthalate, and dicyclohexyl phthalate. Although these plasticisers may be used at the present invention in view of their physical properties, they are not preferred, but avoided for environmental reasons.

As particular examples of preferred esters of dicarboxylic acids may be mentioned diisobutyl adipate, di(n-heptyl, n-nonyl)adipate, dioctyl adipate [di(2-ethylhexyl)adipate], dicapryl adipate, diisodecyl adipate, dinonyl adipate, di(tridecyl) adipate, dimetyl sebacate, dibutyl sebacate, and di(2-ethylhexyl) sebacate. Of these dioctyl adipate is a particularly preferred plasticiser.

Among the amides the N-substituted $C_4$–$C_{18}$ alkyl amides of $C_6$–$C_{10}$ dicarboxylic acids compounds corresponding to those of the above $C_4$–$C_{18}$ alkyl esters of $C_6$–$C_{10}$ dicarboxylic acids may be mentioned where the amide moiety is selected from butyl amide, pentyl amide, hexyl amide, heptyl amide, octyl amide, nonyl amide, decyl amide, undecyl amide, dodecyl amide, tridecyl amide, etc.

The esters of phosphoric acid are preferably selected from alkyl, alkoxy, aryl, alkylaryl, or arylalkyl esters of phosphoric acid. The alkyl or alkoxy moiety of these esters preferably has 6–16 carbon atoms, more preferably 8–14 carbon atoms, and the aryl moiety preferably is phenyl which may be unsubstituted or substituted with $C_1$–$C_4$ alkyl och hydroxyl. Particularly preferred examples of esters of phosphoric acid are alkyldiphenyl phosphates, such as metyldiphenyl phosphate, 2-etylhexyl diphenyl phosphate, isodecyl diphenyl phosphate, t-butylphenyl diphenyl phosphate; tributyl-phosphate; tricresyl phosphate; triphenyl phosphate; and tributoxiethyl phosphate.

As preferred examples of mineral oil may be mentioned aliphatic, aromatic or , preferably, naphtenic oils.

The plasticisers defined and exemplified above may be used alone or in combination with each other.

The amount of the plasticiser, when present, should be that required to obtain the desired softness and flexibility of the final polymer composition. The content of the plasticiser is from 0 up to 50% by weight, preferably 5–50% by weight, more preferably 5–30% by weight, most preferably 10–30% by weight, based on the total weight of the composition.

The composition of the present invention may further include a filler. Although there is no particular restriction on the choice of filler, it is preferably selected from inorganic fillers. As examples of particularly preferred fillers may be mentioned calcium carbonate, kaolin, talc, $Mg(OH)_2$, and $Al(OH)_3$. The total amount of filler, when present, is up to 60% by weight, preferably up to 40% by weight, based on the weight of the total composition.

In order to alleviate or inhibit any problems with scorch during processing (extrusion) of the polymer composition of the present invention it may also include a so-called scorch retarding agent. As an example of such agents may be mentioned silane compounds of the general formula IV $$R^1(SiR^2{}_nX_{3-n})_m \qquad (IV)$$

wherein $R^1$ is a monomfunctional hydrocarbyl group having 13–30 carbon atoms, or a difunctional hydrocarbyl group having 4–24 carbon atoms, $R^2$ which may be the same or different, is a hydrocarbyl group having 1–10 carbon atoms, X which may be the same or different, is a hydrolysable organic group, n is 0, 1 or 2, and m is 1 or 2;

as disclosed in EP 0 449 939.

It should be understood that the composition of the present invention may also include conventional additives, such as stabilisers, crosslinking agents, coagents, process aids, etc. The total content of such additives, when present, is up to 10% by weight, preferably up to 5% by weight, based on the weight of the total composition.

It should be understood that the sum of the percentages of all the components present in the ethylenealkyl (meth) acrylate polymer composition of the invention is 100%.

As indicated earlier, an electrical rubber cable having its insulating and/or jacketing layers made of the above described ethylene-alkyl (meth)acrylate polymer composition is superior to conventional rubber cables in that a) it is easier to make and causes less pollution than conventional rubber cables, because the insulating and/or jacketing layers are made of free flowing pelleted raw materials instead of powdery raw materials;

b) it gives a larger choice of cable production equipment, because it is not restricted to production in equipment for rubber processing. Equipment for the processing of polyethylene or PVC may be used e.g.;

c) it is easy to crosslink by moisture curing, instead of vulcanisation involving peroxide or sulphur as in the curing of rubber. This means that there are no problems with peroxide or sulphur smell or rest products;

d) the moisture curing (silane crosslinking) does not require any special curing equipment;

e) the moisture curing permits a wider process window because of the possibility to use higher temperatures and less problems with scorch;

f) higher productivity is possible, because the crosslinking operation is no bottleneck;

g) it has a very good ageing resistance, i.e resistance to air, oxygen and ozone and high temperatures;

h) it has a very good resistance to solvents such as gasoline and oils.

Having thus described the present invention above it will now be illustrated by way of a non-limiting example. In the example all percentages and parts are by weight, unless otherwise stated.

EXAMPLE

An ethylene-methyl acrylate-vinyl trimethoxysilane terpolymer was prepared by radical initiated high pressure polymerisation in a high pressure tubular reactor. The resulting elastomeric terpolymer contained 9 mole % (31% by weight) of methyl acrylate, 1% by weight of vinyl trimethoxysilane and had an $MFR_{2.16}$ of 10 g/10 min, a melt temperature of 71° C., a crystallinity of 7% by weight, a Shore A hardness of 53, a flexibility in terms of the dynamic shear modulus (determined according to ISO 6721-2A, 23° C.) of 4.2 MPa, and a tensile modulus of 2.4 MPa.

The terpolymer was mixed with dodecyl benzene sulphonic acid (a silane condensation catalyst) in a Brabender kneader at 120° C. and 40 rpm for 10 min. Then the composition was compression moulded into a 2 mm thick plaque which was immersed in a water bath at 60° C. for 18 h. The crosslinked plaque was removed from the water bath and the hot set of the crosslinked composition was determined as defined earlier. The composition had a hot set value of 60% which indicates that it was sufficiently crosslinked.

The terpolymer of the Example was used to make a rubber cable by extruding the terpolymer around a metallic conductor and moisture curing the terpolymer after the extrusion.

What is claimed is:

1. An electrical rubber cable comprising an electrical conductor with insulating and jacketing layers surrounding the conductor, characterised in that at least one said insulating and jacketing layers consists of a crosslinked ethylene-alkyl (meth)acrylate-unsaturated silane terpolymer composition wherein the alkyl (meth)acrylate comonomer comprises more than 5 mole % and the terpolymer composition has a tensile modulus, determined according to ISO 527-2 (1 mm/min) of less than 100 MPa.

2. A cable as claimed in claim 1, wherein the terpolymer composition has a tensile modulus of less than 60 MPa.

3. A cable as claimed in claim 1, wherein the terpolymer composition has a tensile modulus of less than 30 MPa.

4. A cable as claimed in claim 1, wherein the terpolymer is an ethylene-alkyl (meth)acrylate-vinyl trialkoxysilane terpolymer.

5. A cable as claimed in claim 4, wherein the alkyl (meth) acrylate comonomer is an alkyl acrylate monomer with the alkyl moiety selected from $C_1$–$C_4$ alkyl groups.

6. A cable as claimed in claim 5, wherein the alkyl moiety is methyl or butyl.

7. A cable as claimed in claim 4, wherein the trialkoxysilane termonomer has the general formula III $$CH_2{=}CHSi(OA)_3 \quad \text{(III)}$$

wherein A is a hydrocarbyl group having 1–8 carbon atoms.

8. A cable as claimed in claim 4, wherein the trialkoxysilane termonomer comprises 0.2–5% by weight of the ethylene-alkyl (meth)acrylate-trialkoxysilane polymer composition.

9. A cable as claimed in claim 1, wherein the terpolymer composition further includes from 0 up to 50% by weight of a plasticiser.

10. A cable as claimed in claim 1, wherein the terpolymer composition further includes up to 60% by weight of a filler.

11. A cable as claimed in claim 1, wherein the terpolymer composition further comprises up to 10% by weight of an additive selected from the group consisiting of stabilisers, crosslinking agent, coagents, and process aids.

12. A cable as claimed in claim 1, wherein said insulating and jacketing layers have a Shore A hardness of less than 85.

* * * * *